(12) United States Patent
Powers et al.

(10) Patent No.: US 7,302,547 B2
(45) Date of Patent: Nov. 27, 2007

(54) METHOD AND SYSTEM FOR SUPPORTING VIRTUAL MAPPINGS FOR SHARED FIRMWARE

(75) Inventors: Richard Dickert Powers, Highland Village, TX (US); Gregory Frank Albrecht, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 435 days.

(21) Appl. No.: 10/955,802

(22) Filed: Sep. 30, 2004

(65) Prior Publication Data

US 2006/0069900 A1   Mar. 30, 2006

(51) Int. Cl.
*G06F 12/00* (2006.01)
(52) U.S. Cl. ........................ 711/209; 719/328
(58) Field of Classification Search ............ 711/209
See application file for complete search history.

(56) References Cited

U.S. PATENT DOCUMENTS 5,778,226 A * 7/1998 Adams et al. ............. 719/311
6,125,430 A * 9/2000 Noel et al. ................. 711/152
2004/0143714 A1* 7/2004 Watt .......................... 711/163
2004/0177243 A1* 9/2004 Worley, Jr. .................... 713/2

OTHER PUBLICATIONS

Doran, Mark, Principal Engineer, Intel Corporation; "EFI 1.10 and Beyond: An Overview"; http://www.intel.com/technology/efi/efibeyondbs.pdf; Feb. 19, 2003; pp. 1-26.

* cited by examiner

*Primary Examiner*—Hashem Farrokh

(57) ABSTRACT

System and method of supporting virtual mappings for shared firmware contents in a computer system are described. In one embodiment, the method comprises, responsive to a function call issued by a processor, determining whether address translation has been enabled for the issuing processor; and responsive to a determination that address translation has been enabled, determining an ID of the issuing processor; identifying a Physical-to-Virtual ("PTV") Map corresponding to the issuing processor; extracting from the identified PTV map a virtual address corresponding to a physical address passed in the function call; and returning the virtual address to the issuing processor.

31 Claims, 5 Drawing Sheets

METHOD AND SYSTEM FOR SUPPORTING VIRTUAL MAPPINGS FOR SHARED FIRMWARE

BACKGROUND

Virtual private server technology allows a dedicated server to be partitioned into multiple virtual partitions, each of which functions as a separate virtual machine although everything in essence is operated off the server itself. A virtual private server enables a customer to enjoy the security, performance and all administrative features of a dedicated server which cannot be found on virtual hosting environment. Each virtual server is isolated from the other virtual servers, thus allowing the customer to install their choice of Operating System ("OS") and software applications.

Virtual private server technology is ideally suited to heterogeneous environments and offers high-end multiple OS capability that enables execution of all of the leading operating systems on the same system concurrently in a consolidated environment. In one exemplary embodiment, virtual private server technology may be implemented within a server system having a multicellular architecture where the basic building block of the server is a cell, or cell board. For instance, each server may contain several cell boards, which are plugged into the backplane of the cabinet. Each cell board can be a self-contained unit, with a symmetric multiprocessor ("SMP") arrangement, main memory, up to eight processors per board (four CPU sockets per board with 2 CPUs per socket) and all necessary hardware. In one embodiment, the processors are implemented using Intel Itanium series processors. Each cell has an optional link to an I/O chassis. Where provided, a cell may connect to its remote I/O chassis through an I/O cable link. This enhances modularity, ensuring independent scalability of processors, memory, and I/O.

Additionally, in some exemplary implementations, a server system embodying the virtual private server technology may provide both hard and virtual, or soft, partitioning support. A hard partition includes, at a minimum, a cell board and an I/O chassis; however, the system can be hard partitioned into larger partitions, which could include all of the cell boards and one or more I/O chassis. The soft partitions can be dynamically resized for the highest degree of flexibility.

The Extensible Firmware Interface (EFI) specification defines a new model for an interface between operating systems and platform firmware. The interface consists of data tables that contain platform-related information, plus boot and runtime service calls that are available to the OS and its loader. Together, these provide a standard environment for booting an OS and running pre-boot applications. The EFI specification is primarily intended for Intel IA-32 and Itanium architecture-based computers and is an outgrowth of the "Intel Boot Initiative" (IBI) program that began in 1998. As shown in FIG. 1, EFI 100 provides an interface between an OS loader 102 and system firmware 104 associated with system hardware 106.

All data pointers and function pointers are maintained in the firmware 104. In one prior art embodiment, whenever a pointer is used, a call is made to a "MapAddress" function. The MapAddress function determines the current mode of the calling processor (i.e., virtual or physical) by checking the contents of a processor status register ("PSR"). If the calling processor is running in virtual mode, the MapAddress function converts the physical address passed to the MapAddress function to a virtual address and returns the virtual address to the portion of code that called the function. In this embodiment, the physical address is mapped to the corresponding virtual address with reference to a Physical-to-Virtual Address Map, which is supplied by the OS through a call to an EFI standard function "SetVirtualAddressMap". This embodiment performs well for hard partitions; however, to be used with virtual partitioning, a complete copy of firmware would have to be maintained for each virtual partition. Clearly, this is inefficient and, in many cases, cost-prohibitive.

In another prior art embodiment, which is implemented in the EFI, when an OS begins operating in virtual mode, the EFI goes through a list of pointers maintained thereby and changes each to reflect its associated virtual address. In this embodiment, any software module that contains a pointer in the list maintained by the EFI registers a "callback" with the system. When the OS goes virtual, a function calls all of the modules that have registered and each of the modules changes all of the pointers therein from their physical addresses to their associated virtual addresses. In this embodiment, once the OS goes virtual, it cannot go back. Again, this so-called solution is both inefficient and, in some cases, ineffective.

SUMMARY

In one embodiment, the invention is directed to a method of supporting virtual mappings for shared firmware contents in a computer system. The method comprises, responsive to a function call issued by a processor, determining whether address translation has been enabled for the issuing processor; and responsive to a determination that address translation has been enabled, determining an ID of the issuing processor; identifying a Physical-to-Virtual ("PTV") Map corresponding to the issuing processor; extracting from the identified PTV map a virtual address corresponding to a physical address passed in the function call; and returning the virtual address to the issuing processor.

DETAILED DESCRIPTION OF THE DRAWINGS

Figure 1:
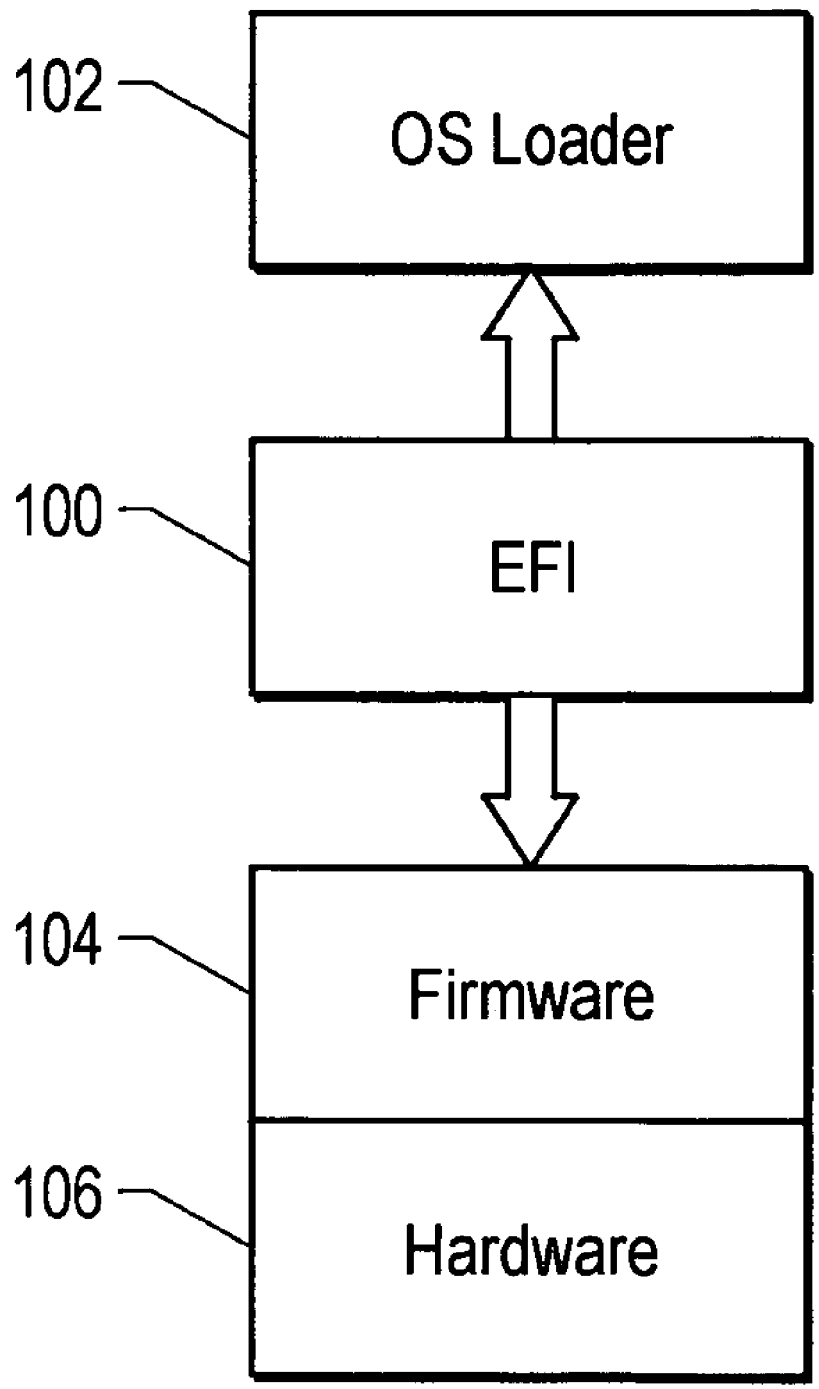
FIG. 1 (Prior Art) is a block diagram of the interaction between Extensible Firmware Interface ("EFI") and an OS loader and system firmware.

In the drawings, like or similar elements are designated with identical reference numerals throughout the several views thereof, and the various elements depicted are not necessarily drawn to scale.

Figure 2:
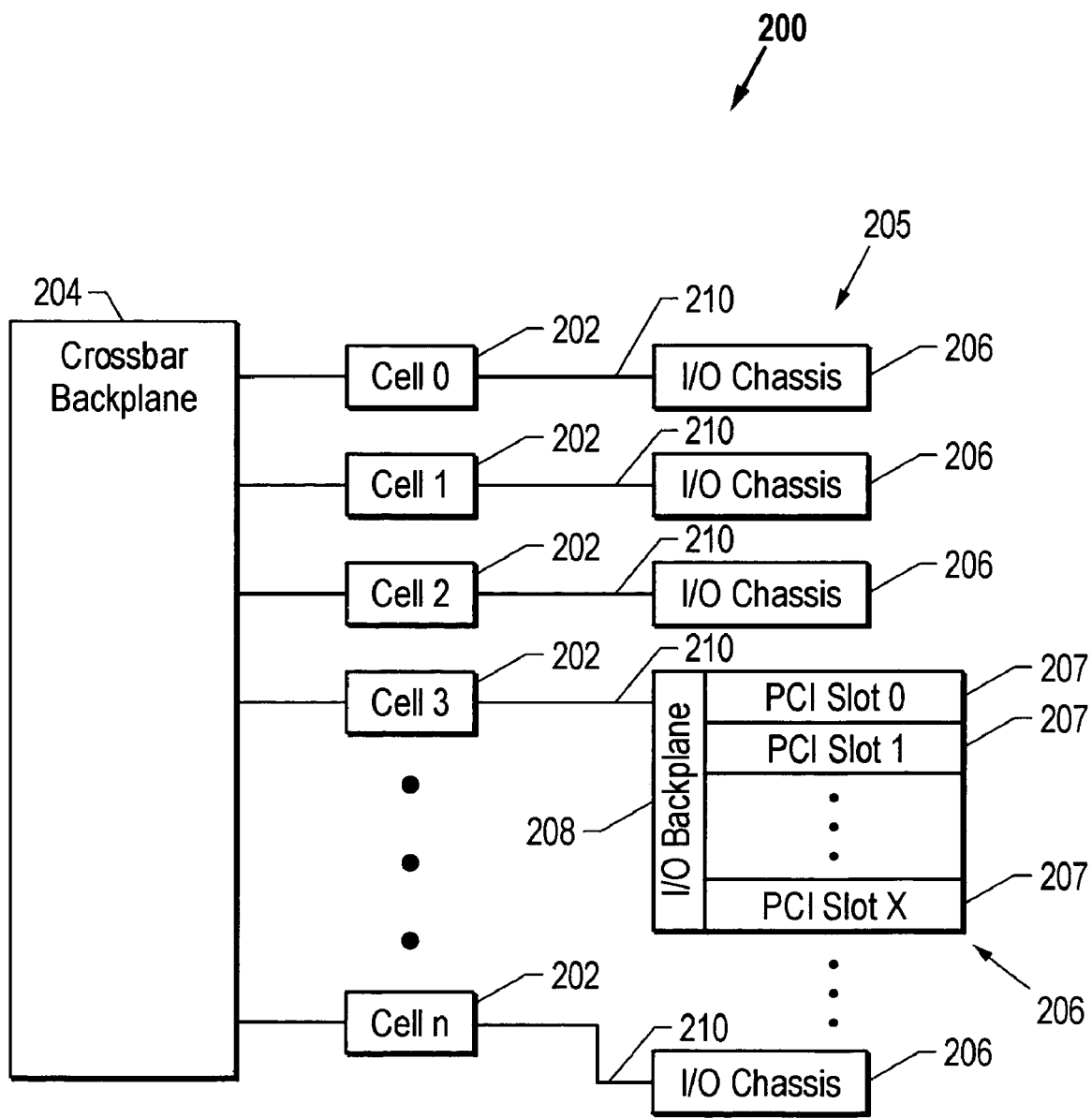
FIG. 2 is a block diagram of a server system embodying features of one embodiment.

FIG. 2 is a block diagram of a server system 200 embodying features of one embodiment. As shown in FIG. 2, the system 200 includes a plurality of cells 202 connected to a crossbar backplane 204. An I/O subsystem 205 comprises several I/O chassis modules 206. Each I/O chassis module 206 includes a plurality of PCI slots 207 disposed on an I/O backplane 208 for receiving a PCI card (not shown). Each of the cells 202 can be connected to one or more of the chassis 206 via cabling 210 between the cell and the backplane 208 of the chassis. It will be recognized that at least one cell in each partition must be connected to at least one I/O chassis.

Figure 3:
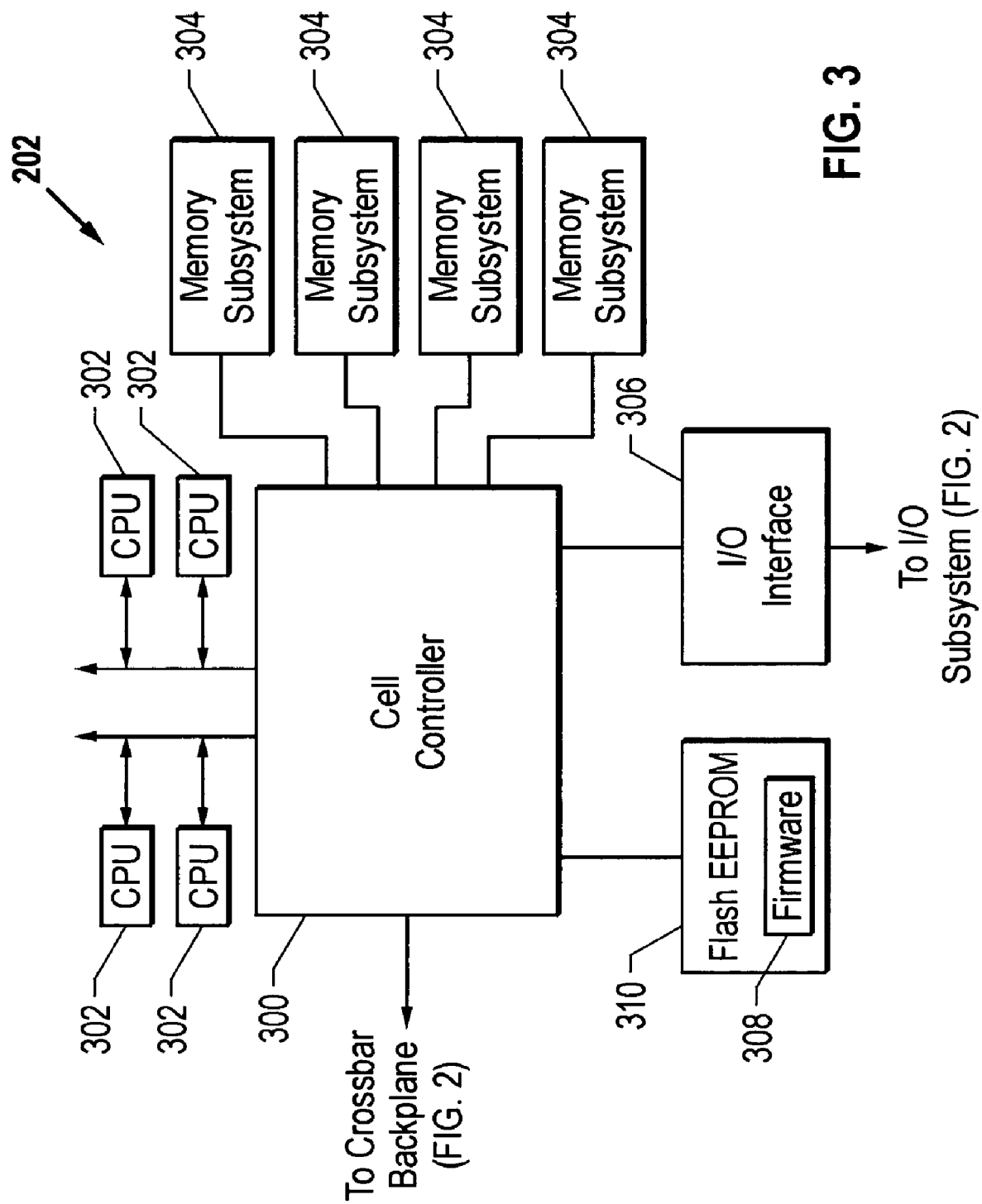
FIG. 3 is a block diagram of a cell of the server system of FIG. 2.

FIG. 3 illustrates a block diagram of one of the cells 202. As shown in FIG. 3, each cell 202 includes a cell controller 300 for coordinating traffic between the major components of the cell 202, including CPUs 302, memory subsystems 304, and an I/O interface 306, and determines if a request requires communication with another cell (via the crossbar backplane 204) or which the I/O subsystem 205 (via the I/O interface 306). Firmware 308 for use by the CPUs 302 is stored in a flash EEPROM 310. The function of the firmware 308 in accordance with one embodiment will be described in greater detail below.

Figure 4:
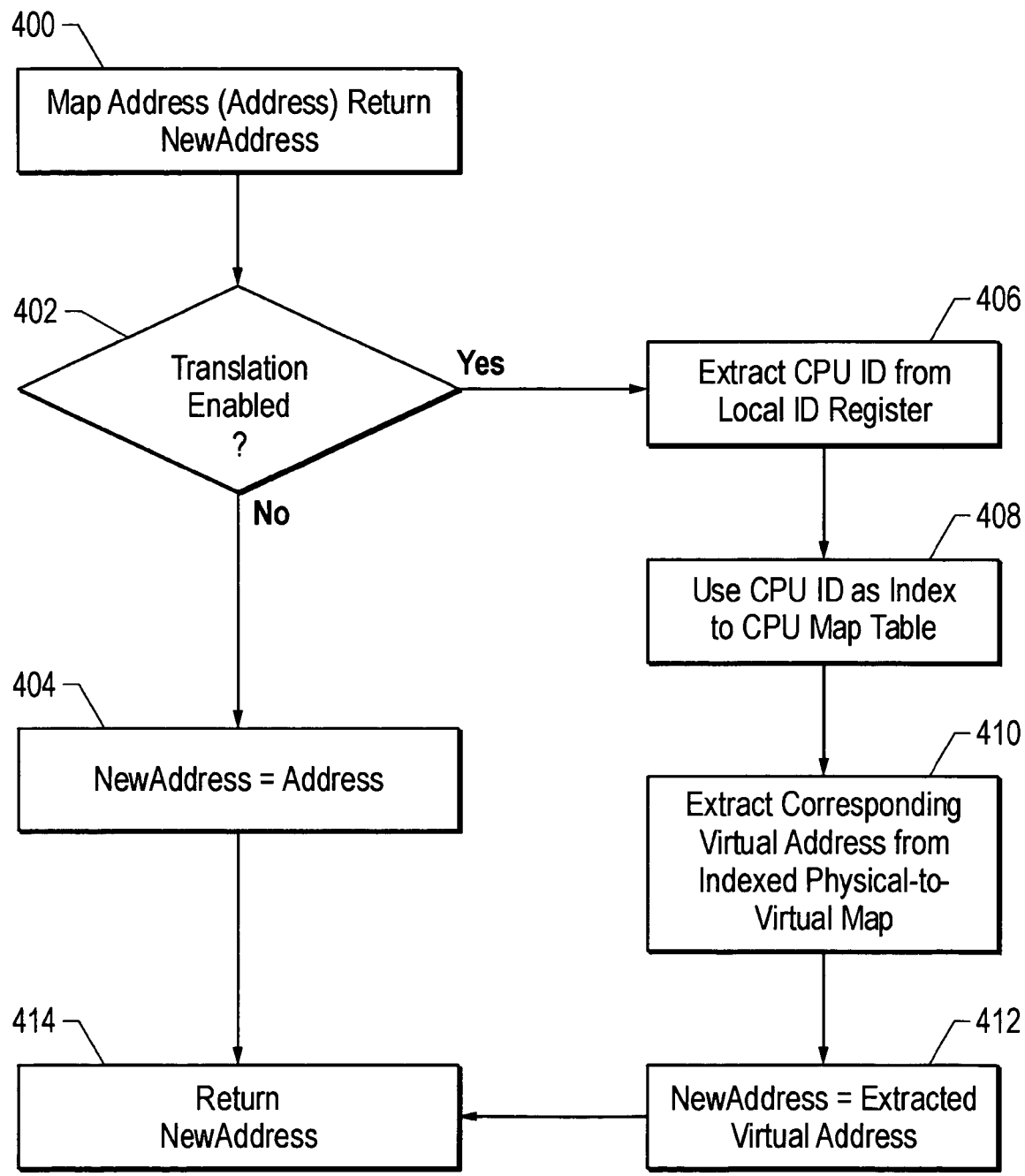
FIG. 4 is a flowchart of the operation of one embodiment.

FIG. 4 is a flowchart illustrating the operation of one embodiment where a MapAddress function call is utilized. The MapAddress function is called within firmware whenever a data or function pointer is used. The MapAddress function converts an address passed as a parameter "Address" in the function call to a virtual address when the processor is operating in virtual mode. In particular, the MapAddress function returns an address ("NewAddress") corresponding to a physical address ("Address") passed in the function call. After the MapAddress function is called in block 400, in block 402, a determination is made whether translation has been enabled; that is, whether the processor is in virtual mode. This block is accomplished by checking the contents of a Processor Status Register ("PSR") associated with the processor, which contains bits used to determine whether data and instruction translation are enabled when firmware is called. If a negative determination is made in block 402, execution proceeds to block 404, in which the value of NewAddress is set to equal the value of Address; i.e., no address conversion takes place. If a positive determination is made in block 402, execution proceeds to block 406, in which the ID of the calling processor is extracted from a local ID register ("LID"), which contains the processor's local interrupt identifier. The contents of the LID are used here to uniquely identify the processor. In block 408, the extracted ID is used as an index into a CPU Map Table 500 (described in additional detail hereinbelow with respect to FIG. 5), which maps each processor ID to a single one of several Physical-to-Virtual Maps $502(0)$-$502(x)$ for the partition in which the calling processor is located.

In block 410, the virtual address corresponding to the value of Address is extracted from the Physical-to-Virtual Map identified in block 408. In block 412, the value of NewAddress is set to equal the virtual address extracted from the Physical-to-Virtual Map. Upon completion of either block 404 or block 412, execution proceeds to block 414, in which NewAddress is returned to the calling portion of the firmware.

Figure 5:
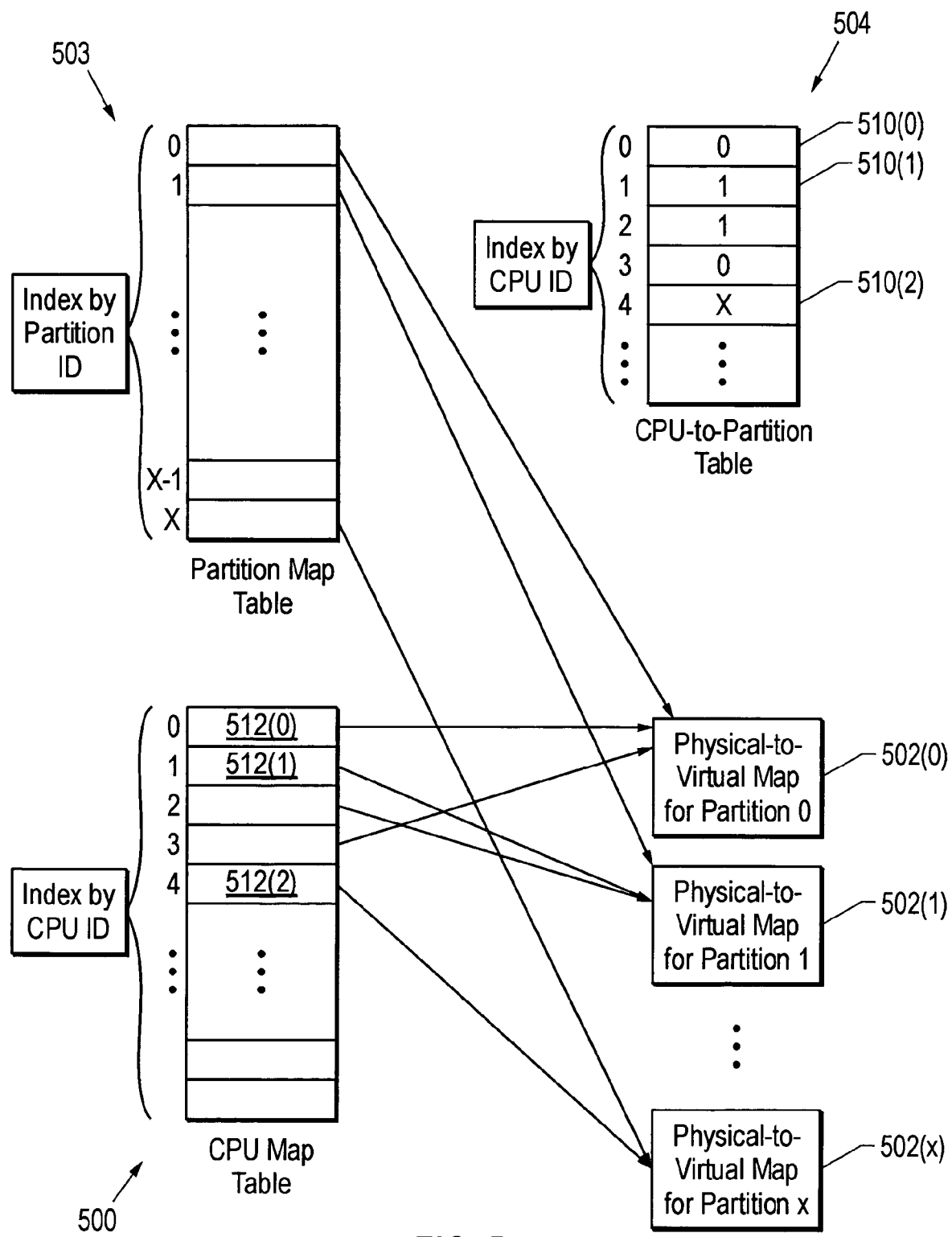
FIG. 5 illustrates various data structures maintained by firmware in accordance with one embodiment.

FIG. 5 illustrates a plurality of data logic structures used to implement one embodiment, as described hereinabove with respect to FIG. 4. Population of these data logic structures will be now be described with particular reference to FIG. 5. When an OS calls a SetVirtualAddressMap function, a new Physical-to-Virtual Map, such as the maps $502(0)$-$502(x)$, for the calling partition is created. A pointer to this new map is entered in a corresponding entry in a Partition Map table 503, which is indexed by Partition ID. Accordingly, the entry indexed by the Partition ID corresponding to the new map includes a pointer to this new map. Pointer mapping information supplied by the OS is used to populate this new map. A CPU-to-Partition Table 504 is indexed by CPU ID and indicates, for each CPU ID, the partition in which the corresponding CPU is located. For example, if the entry of the CPU-to-Partition Table 504 indexed by a first CPU ID is 0, then the CPU identified by the first CPU ID is located in partition 0.

Once the maps $502(0)$-$502(x)$ and table 504 are populated, the CPU Map Table 500 is populated by placing the virtual address of the CPU-to-Partition Table for the partition in which the CPU is located in the entry of the CPU Map Table indexed by the CPU ID. For example, as illustrated in FIG. 5, a first entry 510(0) of the CPU-to-Partition table 504 indicates that the CPU identified by CPU ID 0 is in partition 0. Therefore, an entry of the CPU Map Table 500 indexed by the same CPU ID, which entry is designated by a reference numeral 512(0), contains a pointer to the Physical-to-Virtual Map 502(0), which corresponds to partition 0. Similarly, a second entry 510(1) of the CPU-to-Partition table 504 indicates that the CPU identified by CPU ID 1 is in partition 1. Therefore, an entry of the CPU Map Table 500 indexed by the same CPU ID, which entry is designated by a reference numeral 512(1), contains a pointer to the Physical-to-Virtual Map 502(1), which corresponds to partition 1. Yet another entry 510(2) of the CPU-to-Partition table 504 indicates that the CPU identified by CPU ID 4 is in partition x. Therefore, an entry of the CPU Map Table 500 indexed by the same CPU ID, which entry is designated by a reference numeral 512(2), contains a pointer to the Physical-to-Virtual Map $502(x)$, which corresponds to partition x.

An implementation of the embodiments described herein thus provides method and system for supporting virtual mappings for shared firmware contents, i.e., code, data, or both. In particular, the embodiments shown and described herein allow for firmware to be called in either physical or virtual mode at the same time by different processors. In addition, to support multiple virtual mappings, as described herein, separate Physical-to-Virtual Address Maps are maintained for each partition. The processor ID, derived from the LID, for the calling processor is used to determine which virtual partitions map to use when the translation is performed. Accordingly, with the embodiments described herein, it is possible for multiple OS instances to share the same core firmware code and data while each being able to call firmware with different virtual address mappings in place, via the various Physical-to-Virtual Address Maps for the various partitions. This enables virtual partitioning without necessitating multiple copies of firmware code and data. This reduces memory consumption by firmware in virtual partitioning.

The embodiments shown and described have been characterized as being illustrative only; it should therefore be readily understood that various changes and modifications could be made therein without departing from the scope of the present invention as set forth in the following claims. For example, although one embodiment of the invention has been described as a method, instructions to perform the method can be stored on a computer-readable medium operable with a computer system for supporting virtual mappings for shared firmware contents in the computer system.

What is claimed is:

1. A method of supporting virtual mappings for shared firmware contents in a computer system, the method comprising:

responsive to a function call issued by a processor, determining whether address translation has been enabled for the issuing processor; and responsive to a determination that address translation has been enabled:

determining an ID of the issuing processor;
identifying a Physical-to-Virtual ("PTV") Map corresponding to the issuing processor;
extracting from the identified PTV map a virtual address corresponding to a physical address passed in the function call; and
returning the virtual address to the issuing processor.

2. The method of claim 1 wherein the identifying a PTV Map corresponding to the issuing processor comprises using the issuing processor's ID as an index into a CPU Map Table, wherein the indexed entry contains a pointer to the PTV Map.

3. The method of claim 2 further comprising, prior to issuance of the function call, for each processor in the computer system:
identifying a partition in which the processor is located; and
providing a pointer to a PTV Map corresponding to the identified partition in an entry of the CPU Map Table indexed by the processor.

4. The method of claim 3 wherein the partition in which the processor is located is a virtual partition.

5. The method of claim 1 wherein the determining of whether address translation has been enabled comprises checking contents of a Processor Status Register ("PSR") associated with the issuing processor.

6. The method of claim 1 further comprising, responsive to a determination that address translation has not been enabled, returning to the issuing processor the physical address passed in the function call.

7. The method of claim 1 wherein the determining of an ID of the issuing processor further comprises extracting the issuing processor's ID from a local interrupt identifier stored in a local ID register corresponding to the issuing processor.

8. The method of claim 7 wherein the local interrupt identifier uniquely identifies the issuing processor.

9. A computer system capable of supporting virtual mappings for shared firmware contents, the computer system comprising:
means responsive to a function call issued by a processor for determining whether address translation has been enabled for the issuing processor; and
means responsive to a determination that address translation has been enabled for determining an ID of the issuing processor; identifying a Physical-to-Virtual ("PTV") Map corresponding to the issuing processor; extracting from the identified PTV map a virtual address corresponding to a physical address passed in the function call; and returning the virtual address to the issuing processor.

10. The computer system of claim 9 wherein the means for identifying a PTV Map corresponding to the issuing processor comprises a CPU Map Table indexed by processor's ID, wherein an entry indexed by the issuing processor ID contains a pointer to the PTV Map.

11. The computer system of claim 9 further comprising:
a CPU-to-Partition Table indexed by processor ID, wherein each entry identifies a partition in which the processor identified by the corresponding processor ID is located; and
means for providing a pointer to a PTV Map corresponding to the identified partition in an entry of the CPU Map Table indexed by the processor.

12. The computer system of claim 11 wherein the partition in which the processor is located is a virtual partition.

13. The computer system of claim 9 wherein the means for determining whether address translation has been enabled comprises means for checking contents of a Processor Status Register ("PSR") associated with the issuing processor.

14. The computer system of claim 9 further comprising means responsive to a determination that address translation has not been enabled for returning to the issuing processor the physical address passed in the function call.

15. The computer system of claim 9 wherein the means for determining an ID of the issuing processor further comprises means for extracting the issuing processor's ID from a local interrupt identifier stored in a local ID register corresponding to the issuing processor.

16. The computer system of claim 15 wherein the local interrupt identifier uniquely identifies the issuing processor.

17. A computer-readable medium operable with a computer system for supporting virtual mappings for shared firmware contents in the computer system, the medium having stored thereon:
instructions executable by the computer system responsive to a function call issued by a processor for determining whether address translation has been enabled for the issuing processor; and
instructions executable by the computer system responsive to a determination that address translation has been enabled for:
determining an ID of the issuing processor;
identifying a Physical-to-Virtual ("PTV") Map corresponding to the issuing processor;
extracting from the identified FTV map a virtual address corresponding to a physical address passed in the function call; and
returning the virtual address to the issuing processor.

18. The computer-readable medium of claim 17 wherein the instructions executable by the computer system for identifying a PTV Map corresponding to the issuing processor further comprise instructions for using the issuing processor's ID as an index into a CPU Map Table, wherein the indexed entry contains a pointer to the PTV Map.

19. The computer-readable medium of claim 17 further having stored thereon instructions executable by the computer system for, prior to issuance of the function call, for each processor in the computer system:
identifying a partition in which the processor is located; and
providing a pointer to a PTV Map corresponding to the identified partition in an entry of the CPU Map Table indexed by the processor.

20. The computer-readable medium of claim 17 wherein the instructions executable by the computer system for determining whether address translation has been enabled comprise instructions for checking contents of a Processor Status Register ("PSR") associated with the issuing processor.

21. The computer-readable medium of claim 17 further comprising instructions executable by the computer system responsive to a determination that address translation has not been enabled for returning to the issuing processor the physical address passed in the function call.

22. The computer-readable medium of claim 17 wherein the instructions executable by the computer system for determining an ID of the issuing processor further comprise instructions for extracting the issuing processor's ID from a local interrupt identifier stored in a local ID register corresponding to the issuing processor.

23. The computer-readable medium of claim 22 wherein the local interrupt identifier uniquely identifies the issuing processor.

24. A server system, comprising:
a logic structure operable responsive to a function call issued by a processor for determining whether address translation has been enabled for the issuing processor; and
a logic structure operable responsive to a determination that address translation has been enabled for determining an ID of the issuing processor; identifying a Physical-to-Virtual ("PTV") Map corresponding to the issuing processor; extracting from the identified PTV map a virtual address corresponding to a physical address passed in the function call; and returning the virtual address to the issuing processor.

25. The server system of claim 24 wherein the logic structure for identifying a PTV Map corresponding to the issuing processor comprises a CPU Map Table indexed by processor's ID, wherein an entry indexed by the issuing processor ID contains a pointer to the PTV Map.

26. The server system of claim 24 further comprising:
a CPU-to-Partition Table indexed by processor ID, wherein each entry identifies a partition in which the processor identified by the corresponding processor ID is located; and
logic for providing a pointer to a PTV Map corresponding to the identified partition in an entry of the CPU Map Table indexed by the processor.

27. The server system of claim 26 wherein the partition in which the processor is located is a virtual partition.

28. The server system of claim 24 wherein the logic structure for determining whether address translation has been enabled comprises logic for checking contents of a Processor Status Register ("PSR") associated with the issuing processor.

29. The server system of claim 24 further comprising logic operable responsive to a determination that address translation has not been enabled for returning to the issuing processor the physical address passed in the function call.

30. The server system of claim 24 wherein the logic structure for determining an ID of the issuing processor further comprises logic for extracting the issuing processor's ID from a local interrupt identifier stored in a local ID register corresponding to the issuing processor.

31. The server system of claim 30 wherein the local interrupt identifier uniquely identifies the issuing processor.

* * * * *

UNITED STATES PATENT AND TRADEMARK OFFICE
CERTIFICATE OF CORRECTION

PATENT NO. : 7,302,547 B2  
APPLICATION NO. : 10/955802  
DATED : November 27, 2007  
INVENTOR(S) : Richard Dickert Powers et al.

It is certified that error appears in the above-identified patent and that said Letters Patent is hereby corrected as shown below:

Column 6, line 29, in Claim 17, delete "FTV" and insert -- PTV --, therefor.

Signed and Sealed this

Seventeenth Day of June, 2008

JON W. DUDAS  
*Director of the United States Patent and Trademark Office*